Aug. 22, 1961 M. DE VRIES 2,997,548

PICK-UP

Filed Aug. 28, 1958

INVENTOR.
Machiel DeVries
BY
Fisher, Christen & Goodson,
Att'ys

2,997,548
PICK-UP

Machiel de Vries, De Kempenaerstraat 51, Amsterdam, Netherlands

Filed Aug. 28, 1958, Ser. No. 757,746
Claims priority, application Netherlands May 27, 1958
10 Claims. (Cl. 179—100.41)

In the present state of the art of reproducing sound a relatively large number of different types of gramophone records are on the market which if as good as possible a reproduction of sound is to be obtained and if the wear and tear of the records is to be minimized must each be played with a special pick-up. The art, it is true, already has at its disposal pick-ups having two styli, one of which is suitable for a normal groove and the other for a micro-groove. For other combinations, however, there are no solutions yet. This difficulty has notably come into being now that also so-called stereophonic gramophone records are made in which in a single groove two sound tracks are accommodated which admit of being tracked with a single stylus.

The object of the invention is to provide a pick-up which is suitable for records having a double-track groove, a single-track horizontally modulated groove and a single-track vertically modulated groove respectively, while in these three cases the groove may be a normal groove as well as a micro groove. The pick-up, therefore, can be used in six cases without any modification.

To achieve this end according to the invention the pick-up comprising two identical transducers for converting mechanical vibrations into electrical ones, which transducers are arranged symmetrically relative to a longitudinal plane, is so constructed that the pair of transducers is connected by means of two coupling means that are each symmetrical relative to said longitudinal plane with two stylus holders each provided with a stylus, the radius of the point of the one stylus differing from that of the point of the other stylus.

According to a feature of the invention the pick-up may be so formed that each coupling means comprises two mutually identical lever means, the one ends of said lever means being connected with each other and with a stylus holder and the other ends being each connected with one of said transducers.

According to another feature of the invention the pick-up may be so formed that each lever means consists of two hingedly interconnected arms.

According to a further feature the pick-up according to the invention may be so formed that each lever means at its one side ends in a connecting element bearing against one of said transducers.

According to still another feature of the invention the pick-up may be so formed that the two connecting elements associated with a transducer are united to form one common element.

Furthermore the pick-up according to the invention may be so formed that the two coupling means are united to form one means.

According to a last feature of the invention the pick-up may be so formed that the coupling means consist of a visco-elastic synthetic material.

An embodiment of the pick-up according to the invention will be described with reference to the accompanying drawings.

Figures 1, 2, 3, 4, 5:
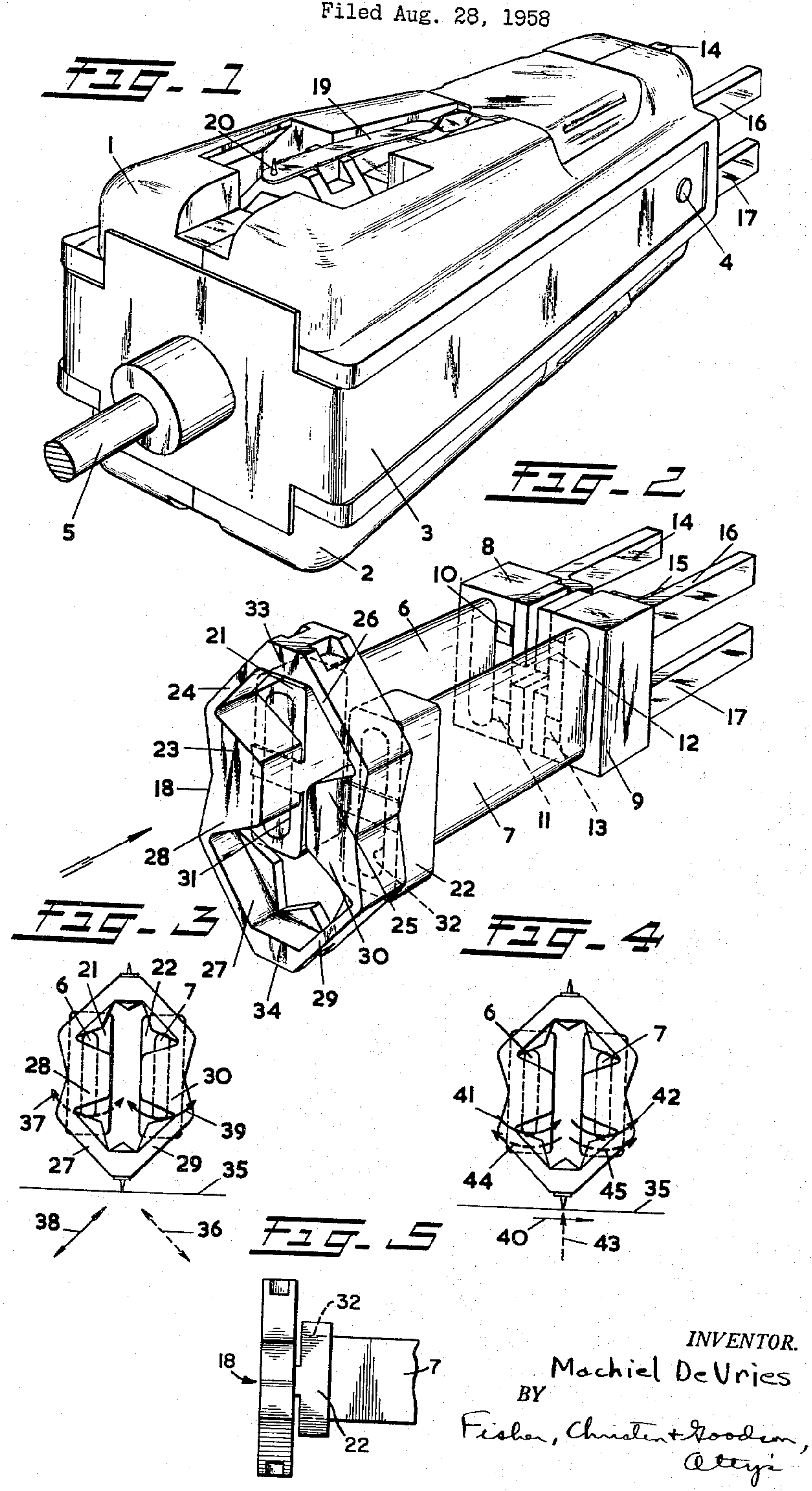
FIG. 1 is a perspective showing of the pick-up.
FIG. 2 is a perspective showing—in the same position as in FIGURE 1—of the two transducers together with a coupling means and the members for the electrical connection.
FIGS. 3 and 4 are elevations on a smaller scale according to the arrow in FIGURE 2.
FIG. 5 is a fragmentary side elevation on the scale of FIGS. 3 and 4, showing the coupling member.

The casing of the pick-up consists of two parts 1 and 2, each part being the mirror image of the other. Said parts 1 and 2 are kept against each other by a strap 3 and a bolt 4. On the strap 3 a pin 5 is provided on which pin a knob (not shown) can be mounted, by means of which knob the pick-up can be brought from the one into the other operative position. Within the casing 1, 2 there are two crystal elements 6 and 7. Said elements 6 and 7 are clamped in the casing 1, 2 by means of blocks of resilient synthetic material 8 and 9. Contact strips 10, 11, 12 and 13 lead to the terminal pins 14, 15, 16 and 17. The free ends of the crystal elements 6 and 7 are connected with two stylus holders by means of a composite coupling means designated in its entirety by the reference numeral 18, one of the stylus holders is designated by the reference numeral 19 and is provided with a stylus 20. The other stylus holder is located diammetrically opposite the stylus holder 19 at the lower side of the pick-up. One of the two stylus holders carries a stylus whose point has a normal radius, whereas the point of the other stylus has a micro-radius. The coupling means 18 consisting of one piece of visco-elastic synthetic material comprises two sleeves 21 and 22 and 8 arms 23, 24, 25, 26, 27, 28, 29 and 30. The arms 23 and 24 respectively are formed symmetrically relative to the arms 25 and 26 respectively, the arms 27 and 28 respectively being formed symmetrically relative to the arms 29 and 30 respectively. The arms 23 and 28 are connected with the sleeve 21 in the place where they pass into each other, while in the same manner the arms 25 and 30 are connected with the sleeve 22. The sleeves 21 and 22 respectively contain slot-like openings 31 and 32 respectively in which the free ends of the crystal elements 6 and 7 respectively are located. The arms 24 and 26 are interconnected by a connecting piece 33, the arms 27 and 29 being connected by a connecting piece 34. The stylus holder 19 loosely bears against the connecting piece 33, the other stylus holder bearing against the connecting piece 34. Also owing to the fact that the various arms are thickened a hinging action between said arms is possible.

As regards the operation of the pick-up I now refer to FIGURES 3 and 4.

FIGURE 3 represents the case in which the pick-up is used for tracking a groove, each of the walls of which is provided with a separate sound-track while each of the walls of said groove enclose an angle of 45° with the surface of the record designated by 35. The one sound-track will set the stylus vibrating in directions indicated by the arrow 36. Said vibrations will be transmitted by the arms 27 and 28 to the sleeve 21 and ultimately they will reach the crystal element 6, but they will not, or at most to a very slight extent, reach the sleeve 22 and the crystal element 7.

The crystal element 6 will be twisted then according to the curved arrow 37. Vibrations of the stylus according to the arrow 38 will twist the crystal element 7 according to the arrow 39, but will not cause a twisting of the crystal element 6. The electrical voltages generated by the two different tracks in the crystal elements 6 and 7 respectively can be taken off separately via the terminal pins, 14 and 15 and 16 and 17 respectively.

The situation that comes into being when a horizontally modulated groove is tracked is shown in FIGURE 4. When the point of the stylus is moved in horizontal direction according to the arrow 40 the two crystal elements 6 and 7 respectively are twisted according to the arrows 41 and 42 respectively. When the terminal pins are suitably connected the result can be achieved that the voltages generated by the two crystal elements 6 and 7 will be series connected, so that double the voltage is obtained. The stylus, however, will also perform vertical movements e.g. owing to the pinch-effect, as well as owing to involuntary irregularities of the record or of the turntable. Such a movement according to the arrow 43 results in torsional movements according to the arrows 44 and 45. Whereas the arrows 41 and 42 point in the same direction the arrows 44 and 45 are oppositely directed. It follows therefrom that when the crystal elements are so connected that a horizontal movement of the stylus results in the voltage being doubled, a vertical movement of the needle will result in a voltage which is zero. This means that the undesirable bysounds will be eliminated to a great extent. To achieve this end it is naturally of the greatest importance for the arms 27 and 28 to be accurately identical to the arms 29 and 30. It may even be of importance, when the lowermost stylus is used, that also the arms 23 and 24 are identical to the arms 25 and 26. It will be clear that when instead of a horizontally, a vertically modulated groove is to be tracked it is possible by an electric switching over of one of the two crystal elements to achieve that the vertical stylus vibrations will result in twice the voltage being given off and that the horizontal vibrations will result in a voltage=zero.

From the foregoing it may appear that the double stereophonic pick-up cannot only be used for tracking single grooves, but that such a pick-up is even better suited for tracking single grooves than a conventional pick-up for single grooves, this in connection with the efficient suppression of undesirable by-sounds.

It should still be noted that if it is desired to solely play stereophonic records a pick-up according to the invention can be used to advantage. It has been found namely that stereophonic records of some makes can be tracked by means of a stylus suited for micro-grooves, whereas this is not the case with other makes of stereophonic records. Also in this case it is of importance that a choice can be made as regards the radius of the stylus point both as regards the quality of the reproduction and the restriction of wear and tear.

Though the relative arrangement of the crystal elements as shown in FIGURE 2 is the most favourable one as regards the total size of the pick-up—by means of this arrangement a very compact pick-up can be obtained—other arrangements of the crystal elements are very well possible without this affecting the other advantages of the construction. Thus an arrangement is possible according to which the longitudinal axes of the crystal elements are likewise located parallel to each other though the crystal elements themselves are not located in one plane.

It is also possible to make the longitudinal axes of the crystal elements coincide in such a manner that the free ends of the crystal element are directed towards each other. In that case the various arms of the coupling means as well as of the two sleeves should not be located exactly in one plane.

In the claims, the term "elastomeric" is used to include materials, either natural or synthetic, having rubber-like, resilient, or visco-elastic characteristics.

I claim:

1. In a binaural pick-up cartridge of the turnover type wherein a casing is bodily reversible to selectively position one of a pair of stylus means in operative engagement with a record groove, a pair of stylus holder means including stylus tips, means to attach said stylus holder means to said casing to dispose said respective stylus tips in oppositely projecting directions in a common plane, said record groove having two angularly related undulatory faces disposed on opposite sides of said common plane, a pair of substantially identical transducer means having a mounting portion and a driven portion, means to attach said mounting portions to said casing to arrange the respective drive portions symmetrically on opposite sides of said common plane and between said stylus holder means, a pair of coupling means having symmetrical configurations with respect to said common plane, each said coupling means including two driven portions and a common driving portion responsive to transmit vibrations impressed at said two driven portions to said common driving portion, means to mount said coupling members respectively on opposite sides of said plane to operatively connect the driving portions of said respective coupling means to the driven portions of the respective transducer means and to operatively connect each of the two driven portions of each coupling means each to a respective stylus means, each said common driven portion of a respective coupling means being spaced from said common plane to be responsive substantially only to vibrations impressed by a groove face disposed on the respective opposite side of the common plane.

2. A pick-up described in claim 1 wherein each of said symmetrical configurations of said coupling means includes two mutually identical arms, one end of each of said arms of one coupling means being connected to the respective ends of the arms of the coupling means and with a stylus holder, and the other ends of said arms being each connected with one of said transducers.

3. The pick-up described in claim 2 wherein each arm consists of two hingedly interconnected portions.

4. The pick-up described in claim 1 wherein each of said coupling means are formed integrally with each other of elastomeric material.

5. The invention as defined in claim 4, wherein said transducer means comprises a pair of strips of piezoelectric material disposed in parallel relationship, and said means to mount the coupling members comprises a pair of sleeves of elastomeric material adapted to engage with the driven portions of said piezoelectric strips, said coupling members and said sleeves being integrally formed.

6. In a binaural pick-up of the turnover type for playing back a V-shaped record groove having two different record undulations extending along the respective opposite faces of the groove, comprising, support means, a pair of styli, a pair of mechanoelectric transducers having a mounting portion and a movable driven portion, and a motion-transmitting system, said system including two coupling means, each said coupling means comprising at least two longitudinally extending arms joined at their one ends and having remote portions extending divergently away from said juncture in directions generally normal to the respective planes of said opposite faces of the record groove whereby each said arm will vibrate responsively substantially only to the undulations of a single groove face, means to mount said styli on the support means to selectively engage with a record groove, means to support the mounting portions of the transducers on said support means, means to support the motion-transmitting system on said transducers to operatively engage the respective junctures of the coupling means with the respective styli and to operatively engage the respective remote portions of the coupling means with the driven portions of the transducers.

7. The invention as defined in claim 6, wherein the remote portions of said longitudinally extending arms are provided with integrally formed angularly directed extensions, said motion-transmitting system being mounted to operatively engage said extensions with said transducers.

8. The invention as defined in claim 6, wherein each of said coupling means includes a pair of L-shaped members integrally joined at their one ends, said motion-transmitting system being mounted for operative engagement between each styli and a respective juncture of the L-shaped members and for operative engagement between the respective free ends of the L-shaped members and the driven portions of the transducers.

9. The invention as defined in claim 6, wherein said motion-transmitting system comprises an integrally formed element composed of elastomeric material.

10. In a binaural pick-up for a record groove having two distinct groove modulations extending along different angularly related planes, support means, two mechano-electric transducer means each having a mounting portion connected to said support means and a driven transducer portion responsive to driving motion to deliver electric signals, stylus means for engaging said groove, an integrally formed coupling member drivingly connecting said stylus means to said two driven transducer portions and including at least four longitudinally extending arms flexurally joined at arm joints of their adjacent ends into an endless arm chain, two different portions of said arm chain which extend in different directions from and are spaced from one of said arm joints being drivingly connected to said two driven transducer portions, said stylus means including one stylus connected to said one arm joint of said coupling member and being supported thereby for moving in two angularly related planes corresponding to the planes of the different groove modulations and causing said transducer means to deliver corresponding distinct signals and another stylus connected to a diametrically opposite arm joint of said arm chain.

References Cited in the file of this patent

UNITED STATES PATENTS

| | | |
|---|---|---|
| 2,114,471 | Keller | Apr. 19, 1938 |
| 2,825,763 | De Vries | Mar. 4, 1958 |
| 2,934,610 | Dieter | Apr. 26, 1960 |
| 2,944,118 | Gray | July 5, 1960 |
| 2,947,821 | Heibel | Aug. 2, 1960 |

FOREIGN PATENTS

| | | |
|---|---|---|
| 686,777 | Great Britain | Jan. 28, 1953 |

UNITED STATES PATENT OFFICE
CERTIFICATE OF CORRECTION

Patent No. 2,997,548 August 22, 1961

Machiel de Vries

It is hereby certified that error appears in the above numbered patent requiring correction and that the said Letters Patent should read as corrected below.

Column 4, line 24, before "coupling" insert -- other --.

Signed and sealed this 16th day of January 1962.

(SEAL)
Attest:

ERNEST W. SWIDER
Attesting Officer

DAVID L. LADD
Commissioner of Patents